(12) United States Patent
Voigt et al.

(10) Patent No.: US 6,446,906 B1
(45) Date of Patent: Sep. 10, 2002

(54) FIN AND COVER RELEASE SYSTEM

(75) Inventors: Allan A. Voigt; Che-Ram S. Voigt; John S. Speicher, all of Geyserville, CA (US); Charles R. Ericson, Windsor, CA (US)

(73) Assignee: Versatron, Inc., Healdsburg, CA (US)

( * ) Notice: Subject to any disclaimer, the term of this patent is extended or adjusted under 35 U.S.C. 154(b) by 0 days.

(21) Appl. No.: 09/825,808

(22) Filed: Apr. 4, 2001

Related U.S. Application Data

(60) Provisional application No. 60/195,021, filed on Apr. 6, 2000.

(51) Int. Cl.[7] .................................................. B64C 9/36
(52) U.S. Cl. ........................................ 244/3.27; 244/49
(58) Field of Search ........................ 244/49, 3.1, 3.24, 244/3.3

(56) References Cited

U.S. PATENT DOCUMENTS

| | | | | |
|---|---|---|---|---|
| 3,114,318 A | * | 12/1963 | Barnes, Jr. et al. | 244/3.27 |
| 4,296,895 A | * | 10/1981 | Pazmany | 244/3.29 |
| 4,523,728 A | * | 6/1985 | Frazer | 244/3.29 |
| 6,073,880 A | * | 6/2000 | Voigt et al. | 244/3.28 |
| 6,224,013 B1 | * | 5/2001 | Chisolm | 244/3.27 |
| 6,299,101 B1 | * | 10/2001 | Schroppel et al. | 244/3.21 |

\* cited by examiner

*Primary Examiner*—Galen L. Barefoot
(74) *Attorney, Agent, or Firm*—Bissell & Bissell; Henry M. Bissell; Henry M. Bissell, IV (57) ABSTRACT

Pyrotechnic actuator cover/fin release system designed for high G forces of gun-launched-systems. As safety feature, system allows the pyrotechnic actuator to be installed as one of the last steps of the final testing sequence and removed safely on disassembly. A first cam action develops initial ejection. Subsequently firing the pyrotechnic pushes both the fins and the covers outward via a second cam surface. The release system both holds covers securely latched until commanded to release and then unlatches covers prior to pushing them open. The cover eject sequence results in the flight forward edge of cover being kicked into air stream. Thereafter the cover is lifted and rotates about its aft release hinge until, at about 30 degrees of rotation, the hinge disengages. The fins then are driven into the fully deployed state by a spring and piston/wedge mechanism on the actuator shaft.

16 Claims, 11 Drawing Sheets

FIN AND COVER RELEASE SYSTEM

CROSS-REFERENCE TO RELATED APPLICATION

This application claims the benefit of U.S. Provisional Application No.: 60/195,021, filed Apr. 6, 2000.

BACKGROUND OF THE INVENTION

1. Field of the Invention

The present invention generally relates to a system for latching the fin covers of a missile having retractable folding fins in the stowed position and for releasing and jettisoning the covers to permit deployment of the fins upon command following launch of the missile.

2. Description of the Related Art

Prior art typically requires one pyro device for each cover being jettisoned. This is costly, especially for a low cost application such as gun launched guided munitions. Prior art also requires wires to be connected to each individual pyrotechnic device.

A key objective of the present invention is to be able to withstand the severe accelerations during gun launch and subsequently to function correctly during flight. It is desired to retain the covers over the canard slots throughout the storage life of the round and during the gun launch as well as in the initial portion of the flight. It is then desired to release the covers upon command from the flight control system and eject them in such a way that the covers do not impact any portion of the vehicle, such as the tail fins, as they are jettisoned. Further, at the time the covers are jettisoned the fins are to unfold from within the vehicle and extend into their flight controlling position in the air-stream.

It is desired to use a single electrically initiated pyrotechnic actuator (pyro device) which, upon electrical command, ignites a propellant charge which pushes a piston. The piston in turn moves the mechanism which first unlatches the covers and then pushes them off.

For convenience the pyrotechnic device, which converts the electrical command signal into force and motion, should be accessible from outside the round after the major portion of the assembly and testing has been completed.

It is desirable to be able to release the covers and extend the fins when the fins and covers are completely stowed and in their storage prelaunch state in order to allow testing and access for any rework found to be necessary at that time. This should be capable of accomplishment by simple hand tools. During this procedure, the pyrotechnic device should be removed from the assembly first as a safety issue prior to other tasks.

It is required that the fins and covers be easily folded and installed, with reasonably simple assembly tools, as part of the normal assembly procedure. Any electrical connections to the pyrotechnic squib actuator should be established more or less automatically as part of the pyrotechnic device installation process. It is critical that these are reliable after being subjected to the launch shock.

SUMMARY OF THE INVENTION

The invention is essentially as described in the accompanying Abstract of the Disclosure. In brief, particular arrangements in accordance with the invention incorporate apparatus for the control, storage and deployment of the steering fins of a missile. In storage, these fins are protected by covers which are firmly latched in the stowed position. In such position, the covers serve to prevent the fins from deployment. The system has the capability of withstanding the shocks and high G forces of the launch procedure, including those encountered during launch from a gun which may reach a level of 30,000 G's. Following launch, arrangements of the invention provide for the immediate and simultaneous release and jettisoning of the covers, followed by deployment of the fins into proper control positions.

The activation of the system of the invention begins with the firing of a pyrotechnic device. As a result, the pyrotechnic pin pushing actuator is caused to extend in response to an electrical command signal. As the pyrotechnic actuator piston extends it pushes a wedge member into a ramped feature in a centrally located spool, causing the central spool to move forward (upward in the drawings), which in turn causes rocker arms that are engaged in an annular groove in the spool to be moved forward on their innermost portion. This causes the arms to rock or pivot about the pivot bearing provided. As the arms pivot, their outer ends, which are provided with latching hooks, are caused to disengage a mating feature provided on the inner side of the slot covers, thus releasing the covers. As the arms continue to rotate, a portion of the latching hook which is designed to provide a camming action on the cover kicks the cover outward. Because the cover is captured temporarily by a hinge at the aft edge, the cover pivots about that hinge. This causes the forward edge of the slot cover to enter the airstream and the dynamic pressure, caused by flight speed, further lifts the cover away from the slot opening. The cover continues to rotate about its aft edge hinge until, at about 20 or 30 degrees of total rotation, the hinge disconnects and the cover is free to fly away from the round.

Particular benefits from the development of the latch and release system of the invention relate to the fact that the latch arms and the actuating spool are mass balanced as a group. This allows the system to withstand the high acceleration loading at launch without inadvertently unlocking. In addition, to further protect from inadvertent unlocking, the central spool is retained by a member that must be sheared by the effect of the wedge driven by the high force from the pyrotechnic actuator before the arms can move.

Assembly of the various components in the apparatus of the invention is a relatively simple procedure. The system is easily assembled during the process of installing the aftmost actuator plate molded housing. The concept for assembly is a simple placement of the four release latch rocker arms in their saddles in the mid-housing and engaging them with the annular ring in the central spool. All the components are then captured by the aft housing plate as it is attached to the mid plate. The activating wedge which is driven by the pyro actuator is installed later. A tool can be used to reach in through the pyro access port to operate the fin/cover spool and engaged rocker arms to test the release mechanism.

The fins are not retained by the fin/cover release system unless the covers are in place. After deployment or prior to installation of the covers in the assembly procedure, the fins are locked in the extended position by sliding piston/wedges that are driven by springs located inside the fin shafts. To fold the fins a simple hand tool is used to push the fin locking wedge back into the shaft. Meanwhile the fin is pushed toward its folded position until reaching the point, at about 45 degrees of sweep, where the fin can overcome the wedging effect and retract the piston to reach the completely folded position. The fins will need to be retained with a band or similar tool if they are to remain folded prior to the covers being installed.

The covers can be installed after folding the fins using the procedure described above. Because the release mechanism is coupled to all four covers, the covers must be installed simultaneously. The four covers, with molded on O-ring seals, are set in place with their aft edges engaged in the releasing hinge groove. The covers are then simultaneously pressed inward until the latches are fully engaged. A light force spring is provided to help with this procedure by biasing the central spool toward the latched position. At-this point the retaining wedge can be inserted thru the pyro actuator port. If the latches are not fully engaged the wedge cannot be installed. This operation can be accomplished quickly and easily by one person, using only simple tools.

Deploying the covers, with the resulting fin deployment, can be done manually, without using the pyrotechnic device and prior to installing the device, by using the tool mentioned above which reaches through the pyro access port to operate the fin/cover spool and engages the rocker arms which then release and eject the covers. If the pyro device is already installed, it must first be removed by simply unscrewing the retaining fastener and withdrawing the pyro assembly. The unlatching tool is then inserted as before mentioned.

The pyro actuator assembly used in arrangements of the present invention is similar to that used on the Stinger missile to release the fixed wings. The more or less "standard pin pusher" type of assembly is supported in a molded sub-housing that is inserted thru the outer skin and held by a retaining screw. EMI protection and moisture sealing are provided as well.

As with the Stinger missile, the pyro sub-housing is provided with electrical contacts that automatically, at installation, mate with contact pads that provide firing current to the squib when activated. Squib meters and other conventional test equipment can check the squib circuit.

Normally the squib is not fired during testing and therefore replacement of the pyro actuator is a highly unusual event. Because of the high forces involved with the pyro actuator and the retaining member which the pyro actuator is designed to shear during cover release, the aft cover of the CAS (cam actuator system) must be removed to replace the sheared retaining member. This retaining member assures that the covers stay securely fastened during launch setback and set forward loads. Repeating the steps for the assembly mentioned above will be required after any replacement of the retaining member.

BRIEF DESCRIPTION OF THE DRAWINGS

A better understanding of the present invention may be realized from a consideration of the following detailed description, taken in conjunction with the accompanying drawings, in which:

FIGS. 10, -A, -B, -C and -D, are schematic side views of a portion of the control actuator system of the invention showing the sequence of release of the fin covers and jettisoning into the airstream to permit the fins to be deployed.

DESCRIPTION OF THE PREFERRED EMBODIMENTS

Figure 1:
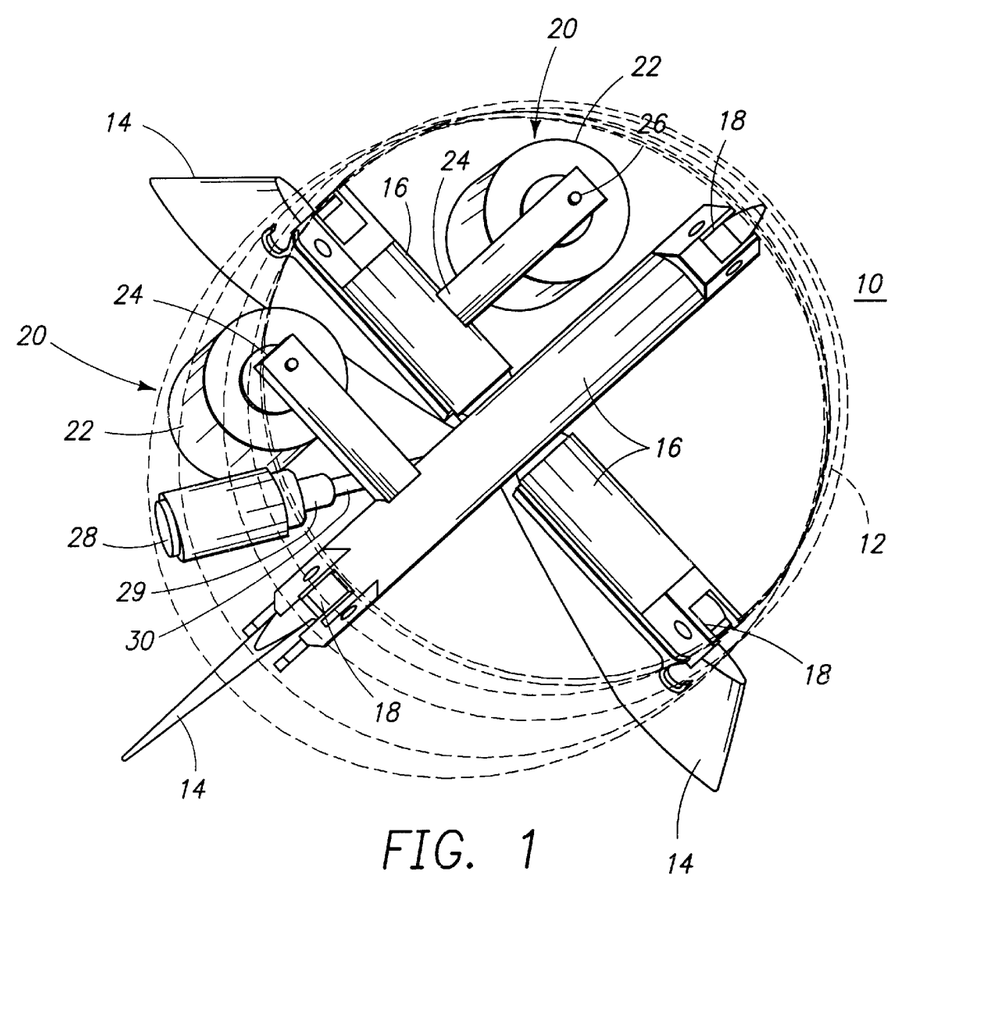
FIG. 1 is a schematic view from forward of the control actuator system of the invention looking aft with the fins retracted and showing the system apparatus mounted within the missile housing (shown in phantom)
Figure 2:
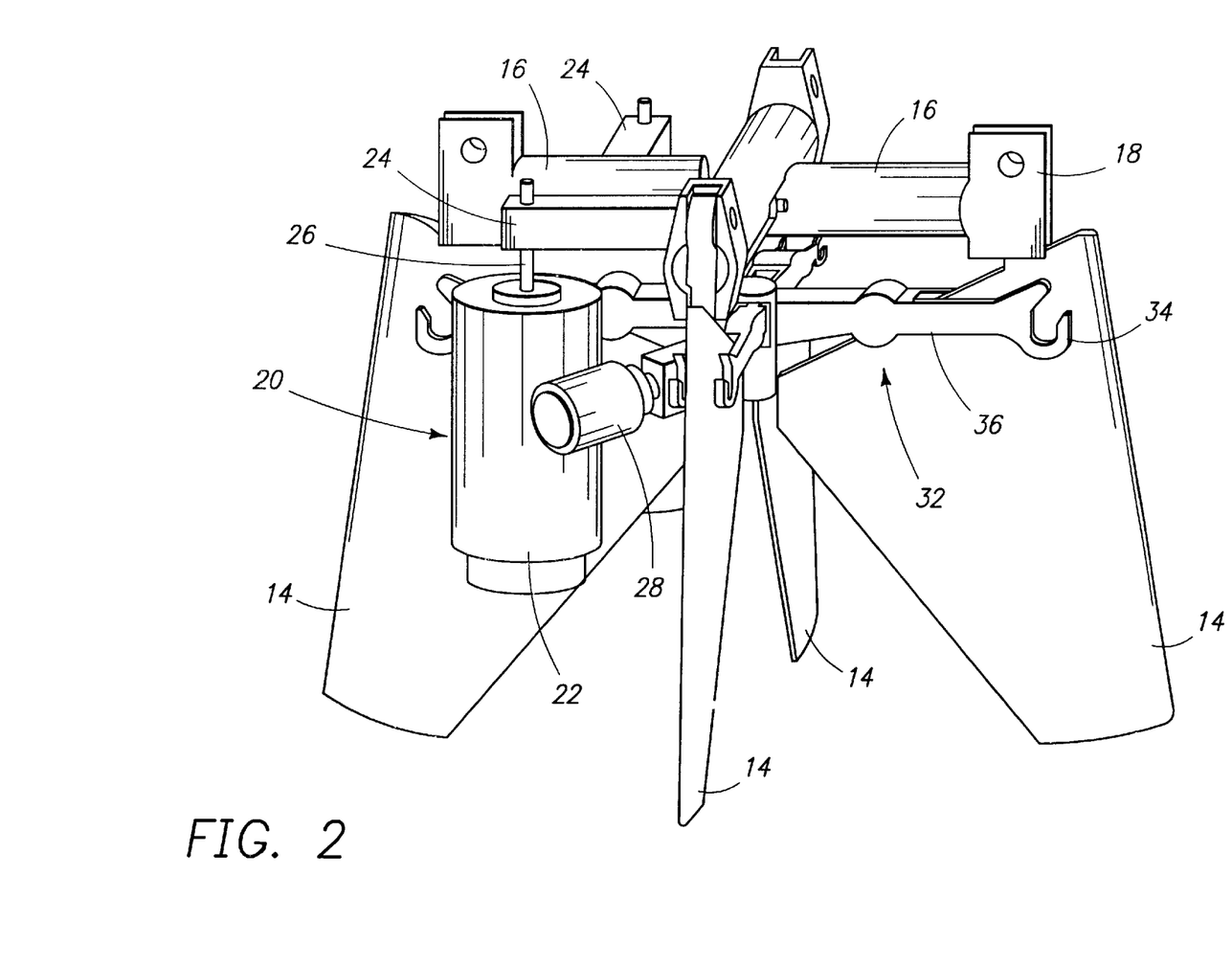
FIG. 2 is a schematic view taken from the side of the system of FIG. 1 showing the fins in stowed position prior to installing the fin covers.
Figure 9:
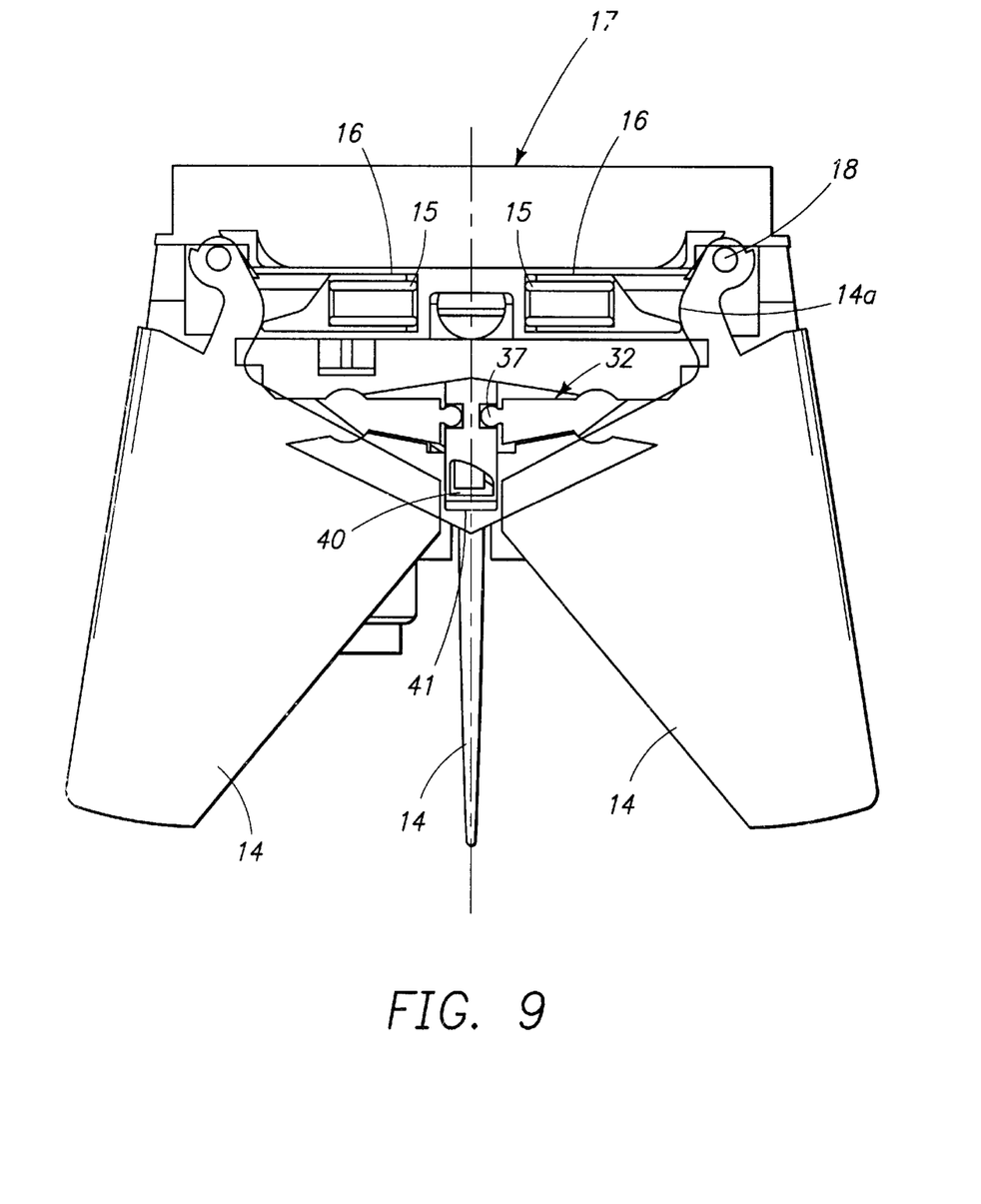
FIG. 9 is a schematic view showing the mounting of the fins and their arrangement in stowed position.

The fin and cover release system of the present invention is depicted in the accompanying drawing figures. Referring particularly to FIGS. 1 and 2, schematic views from the forward end and one side of the structural arrangement, the system 10 is shown in position within the missile skin 12 (depicted in phantom outline). The structural skin 12 of the missile contains system 10 and provides environmental protection for it, also serving to carry the loads which are induced by gun launching. The entire assembly is mounted on a housing 17 (FIG. 9) which supports the assembly within the missile skin.

Four fins 14 are shown in folded position within the skin of the missile, coupled to fin control shafts 16 via fin pivots 18. Fin control actuator assemblies 20, one for each pair of opposed fins, are provided to control fin angles when the fins are deployed. Each actuator assembly comprises an actuator motor 22 coupled to drive a fin control lever 24. The lever 24 contains an internally threaded bore into which the threaded motor shaft 26 is coupled. Driving the drive motor 22 in either direction of rotation produces a corresponding angular deflection of the fin control lever 24 and its associated fin control shaft 16.

Also shown in these figures is a pyrotechnic member 28 having an extendable piston or plunger 29 which bears against a wedge 30. The wedge 30 extends into a central spool 38 (shown partially broken away in FIGS. 5 and 6) which engages four latch members 32, one for each fin cover. These latch members comprise a latch arm 36 which is bifurcated at its outer end, terminating in a pair of latch hooks 34.

Figure 3:
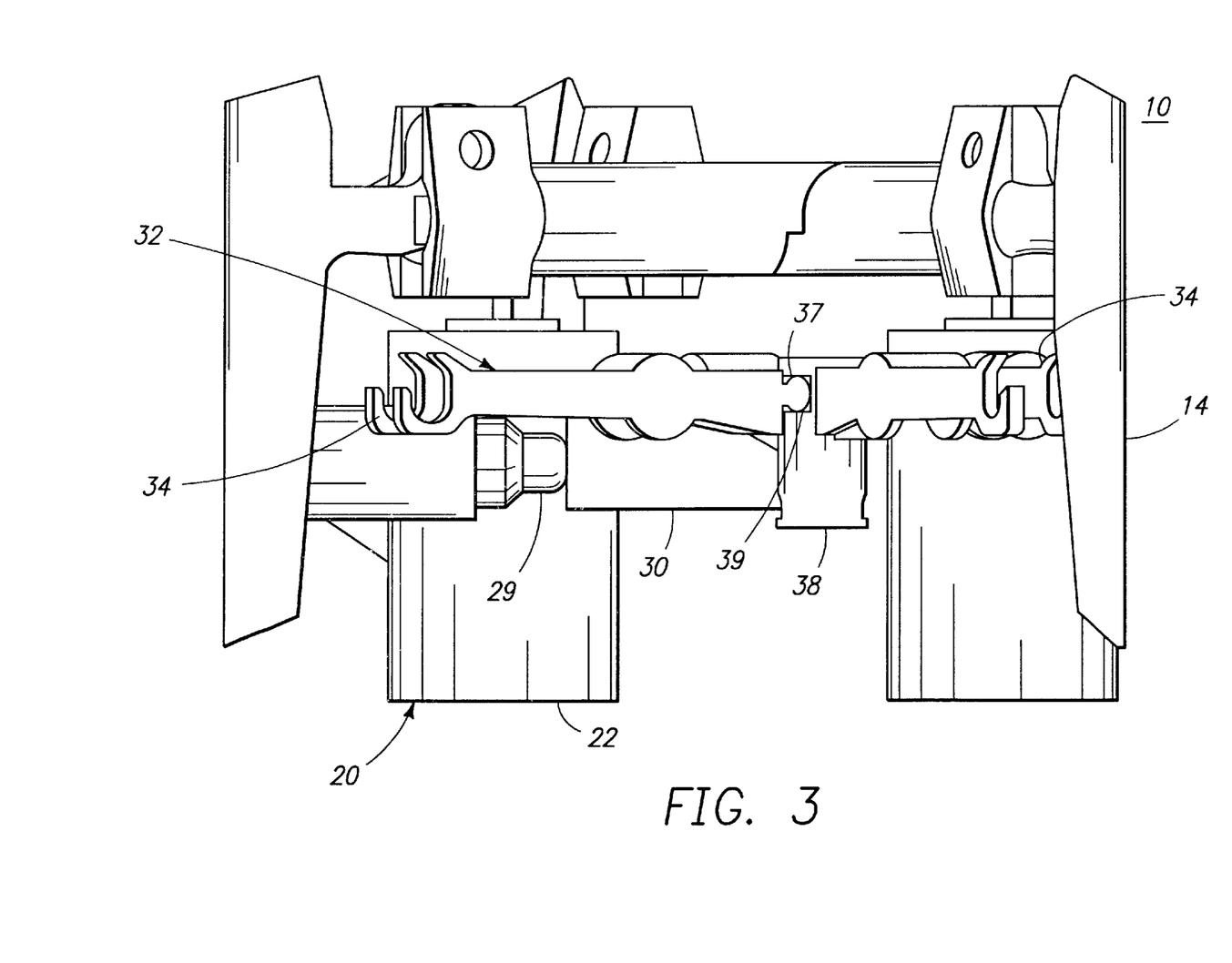
FIG. 3 is a schematic side view, in partial section, of the operative components of the latching arrangement prior to actuation for release of the covers.
Figure 4:
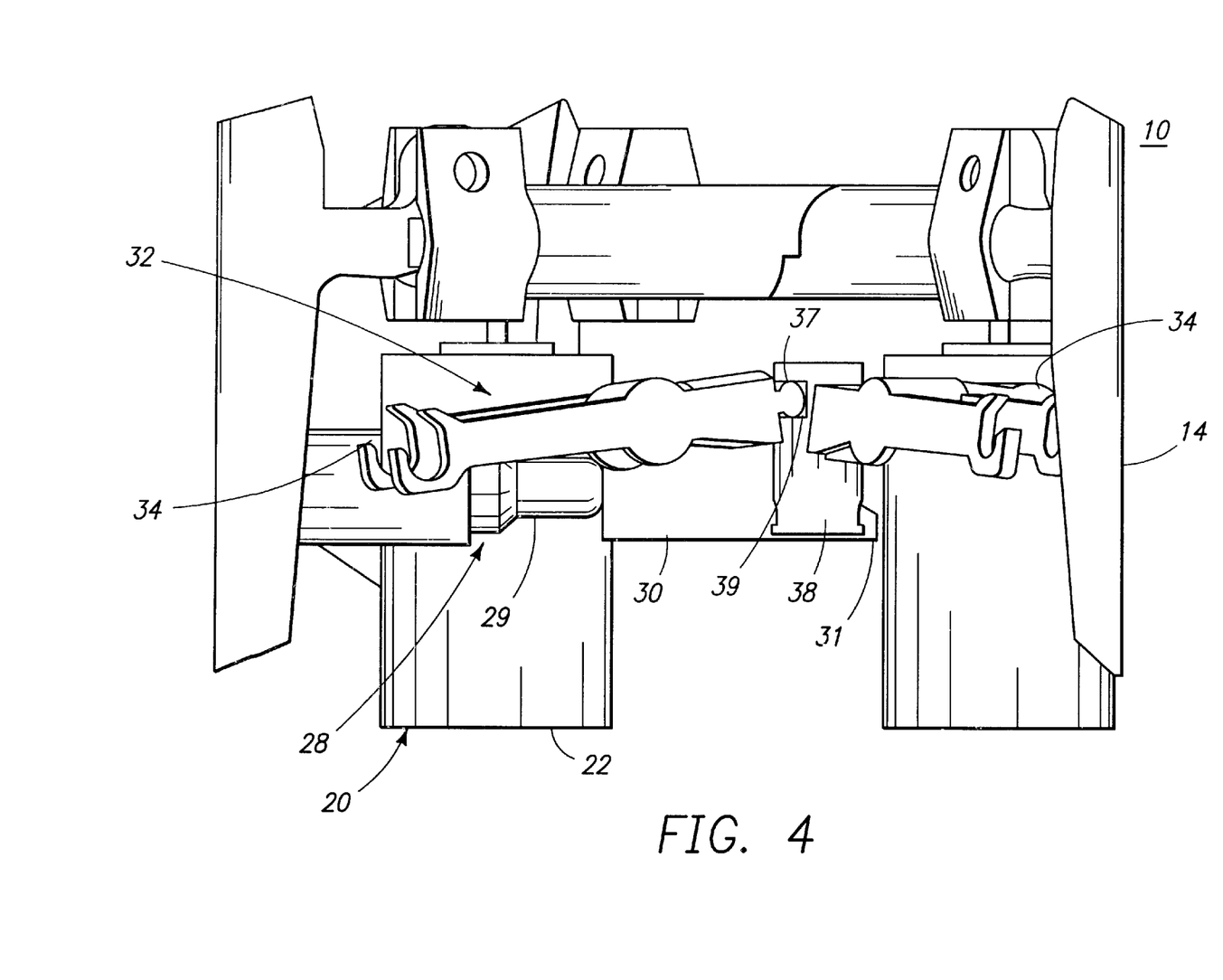
FIG. 4 is a view of the arrangement of FIG. 3 showing the latching mechanism after the pyrotechnic actuator device has been fired.

FIGS. 3–6 better illustrate the operation of the cover latch and release system of the invention. FIGS. 3 and 4 are more detailed views and show the system before and after, respectively, the firing of the pyrotechnic device 28. In FIG. 4, it will be noted that the piston 29 extends from the pyro 28, thereby forcing the wedge 30 into the opening in the lower portion of the spool 38. FIG. 4 shows the nose 31 of the wedge 30 projecting through an opening 40 in the spool 38 and forcing it upwardly to unlatch and release the fin covers. The latch arms 36 are assembled with their inner ends 37 located in rocker arm saddles 39 of the spool 38.

Figure 5:
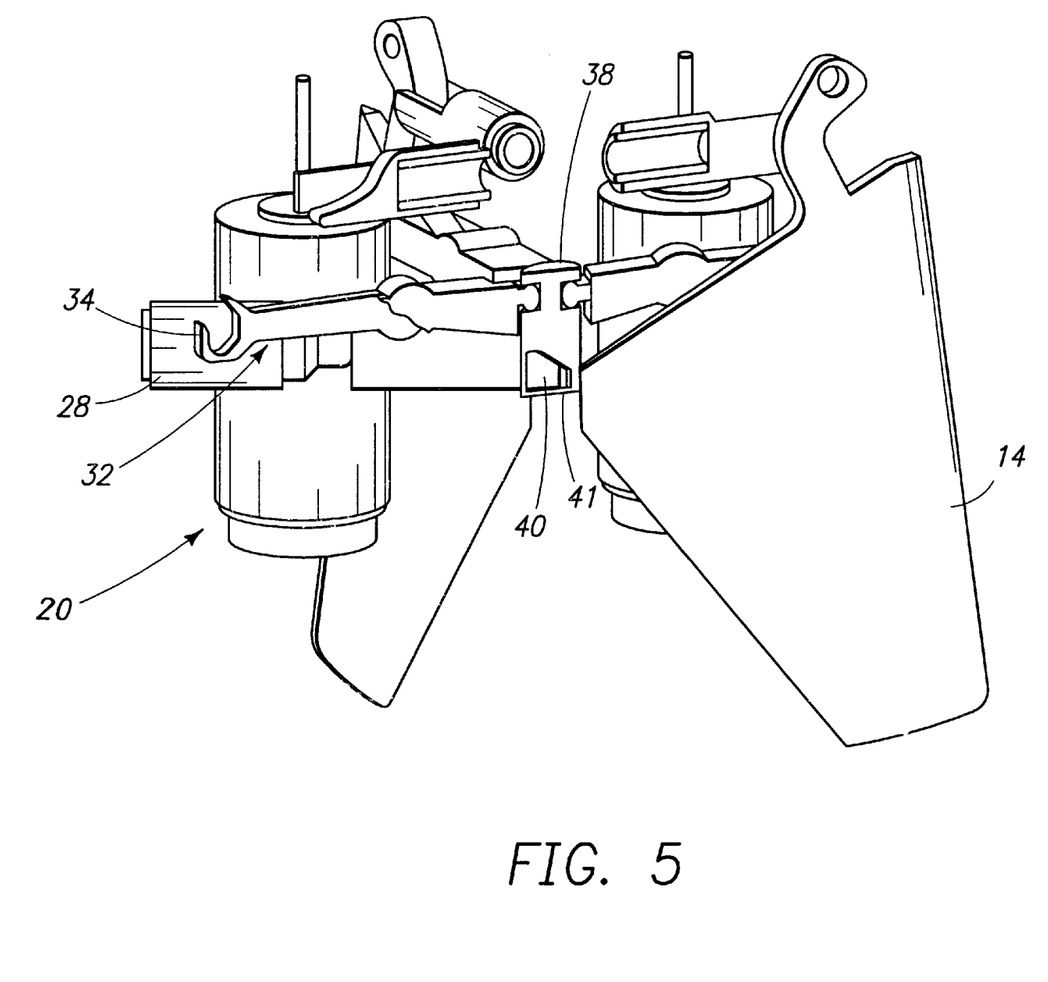
FIG. 5 is a view like that of FIG. 3 prior to firing of the pyrotechnic device and showing the fins in the stowed position.
Figure 6:
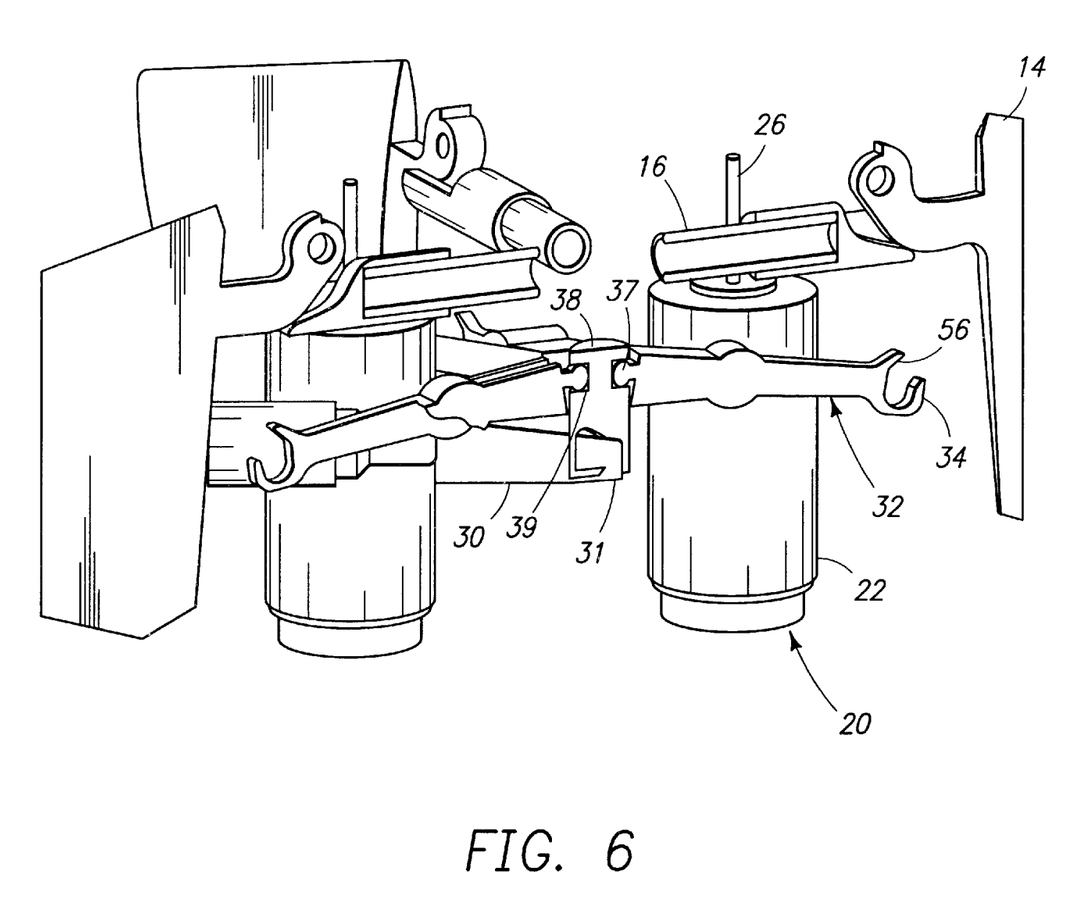
FIG. 6 is a schematic view, in partial section, of the arrangement of FIG. 1, showing the fins as partially deployed after the firing of the pyrotechnic device.

As may be seen in FIGS. 5 and 6, which show the central spool 38 in cross section, the spool near its lower is provided with a wedge opening 40. The bottom or floor 41 of this opening is weak enough to be fractured by the entry of the wedge 30 into the opening 40 when the pyro device 28 is fired. Thus, before the pyro is fired, with the wedge in the retracted position, the nose 31 of the wedge 30 bears against the floor 41 and holds the spool 38 in the downward position, thereby holding the covers firmly latched and held in position, thus preventing the fins from release. When the pyro device 28 is fired, the wedge is propelled forward into the opening 40, fracturing the floor 41 and driving the spool 38 upward, causing the rocker arms 32 to pivot and unlatch and release the fin covers.

Figure 7:
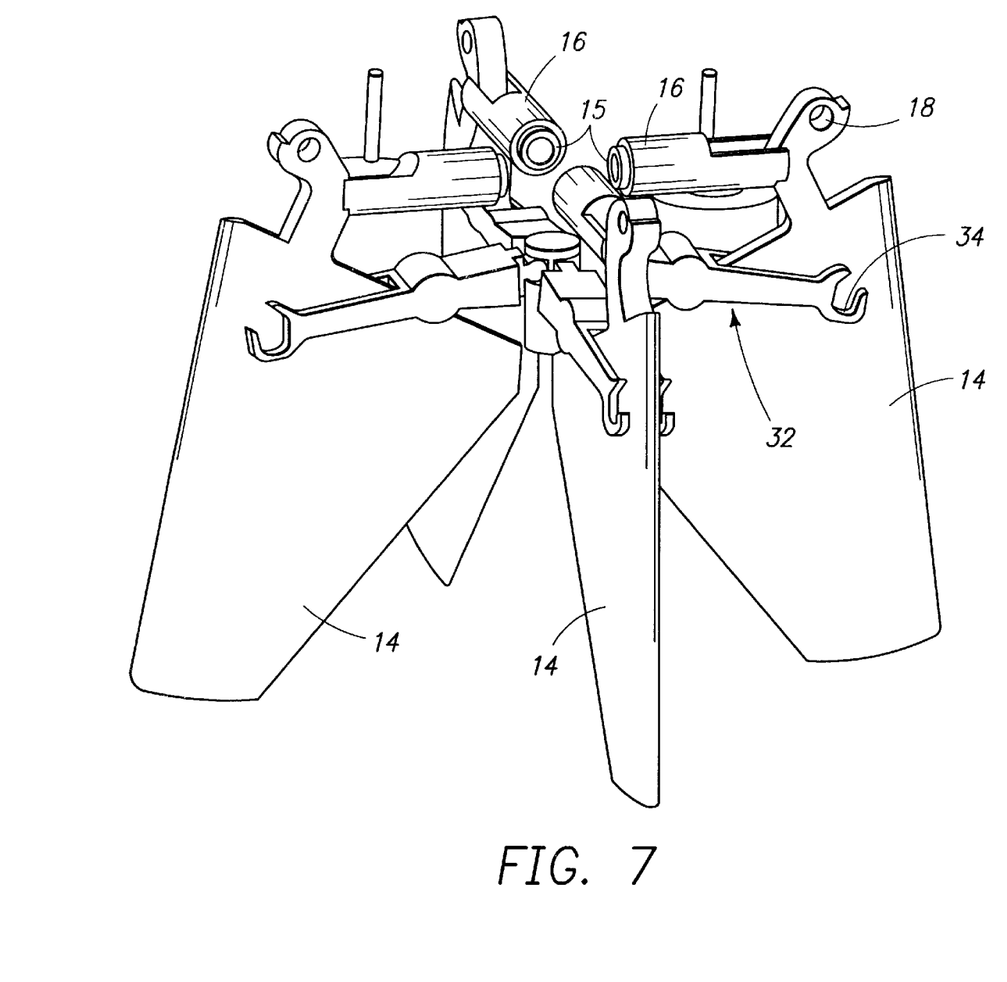
FIG. 7 is a schematic view, in partial cross-section, showing all four of the fins in the stowed position.
Figure 8:
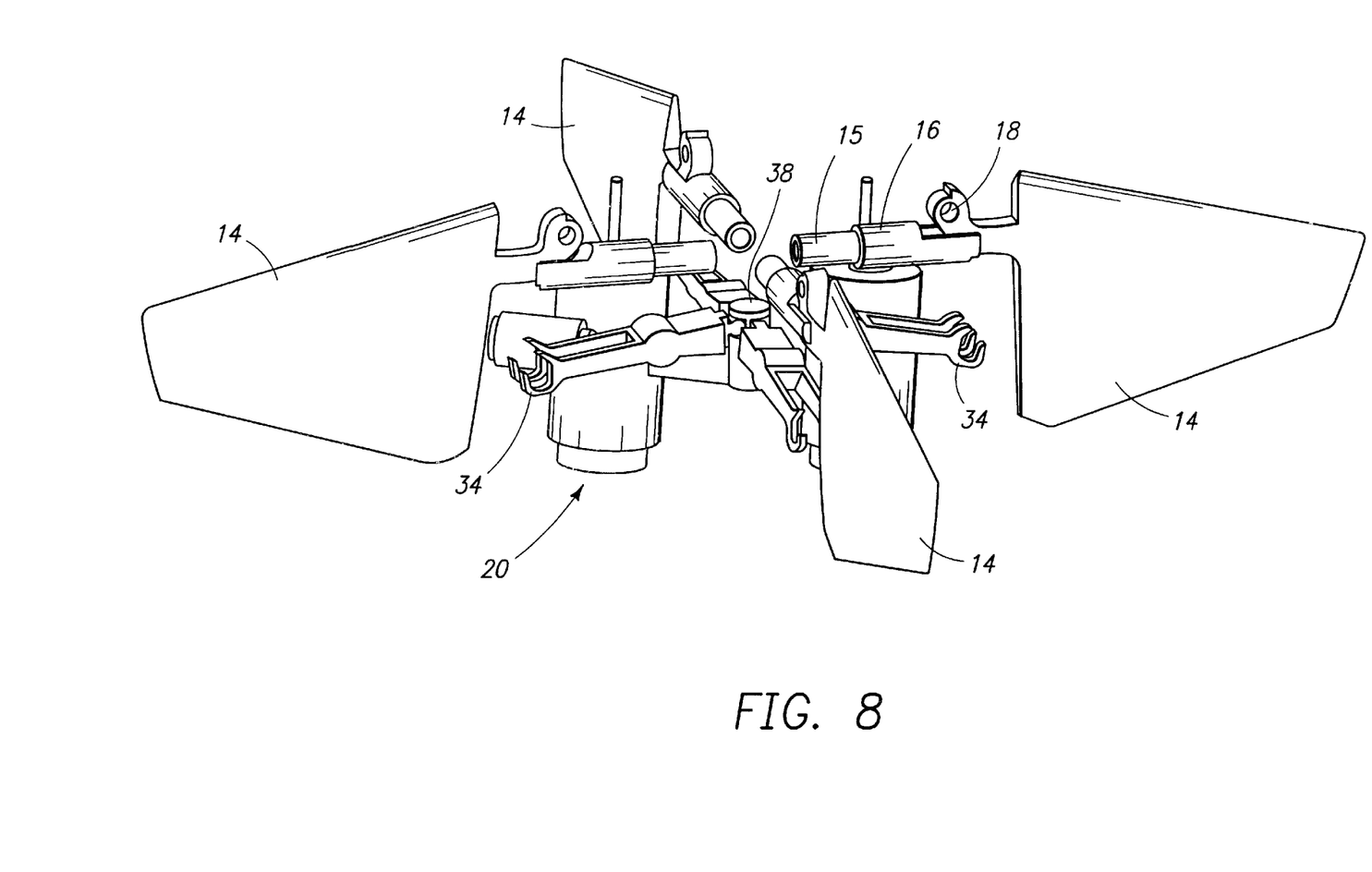
FIG. 8 is a view like that of FIG. 7 but with all four of the fins shown in the deployed position.

FIGS. 7 and 8 are exploded schematic views of operative elements of the system 10 (FIG. 1) showing the latch and release structure respectively before and after fin deployment. In FIG. 7, where the fins 14 are shown in the stowed position, fin deploying springs 15 are shown retracted within hollow piston/wedges 16a aligned with the control shafts 16. In FIG. 8, in which the fins 14 are shown deployed, the springs 15 are shown expanded, having driven the piston/wedges 16a radially outward to deploy the associated fins 14. This structure is better illustrated in the schematic view of FIG. 9 in which the pistons 16a are broken away to show the compressed springs 15. The outer end of a piston/wedge 16a bears against a camming surface of the fin support arm 14a.

This unlatch and release action is best illustrated in FIGS. 10A–10D. These figures show the mechanism associated with a single cover including a fin 14 with its corresponding cover 50. Cover 50 is mounted for pivoting at a lower hinge point 52 and is held by the hook 34 of the latch arm 36. A mating latch hook 54 is affixed to the cover for engagement with the hook 34.

Figure 10A:
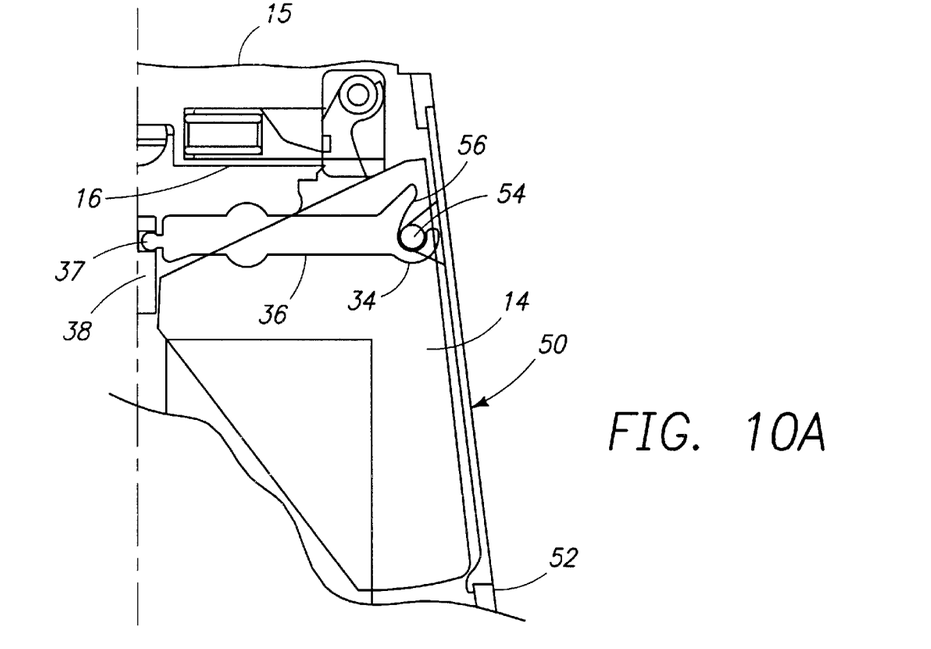
Figure 10B:
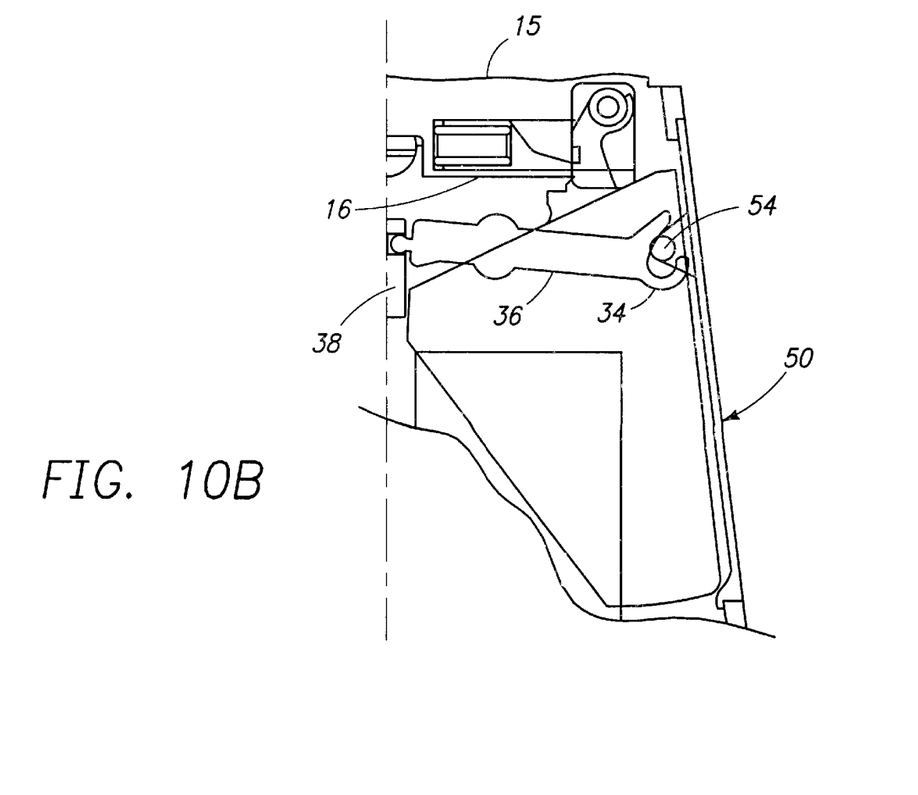
Figure 10C:
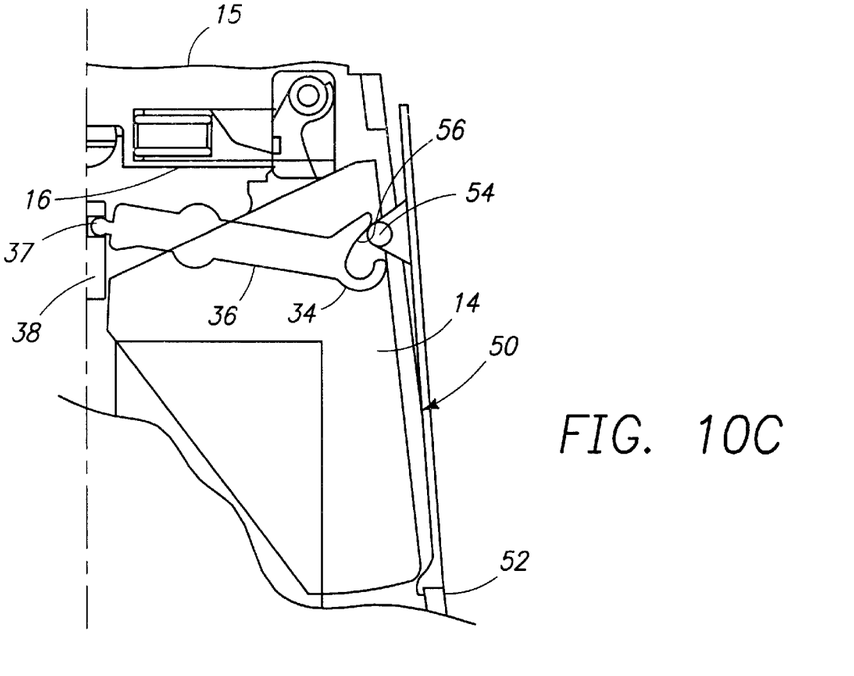
Figure 10D:
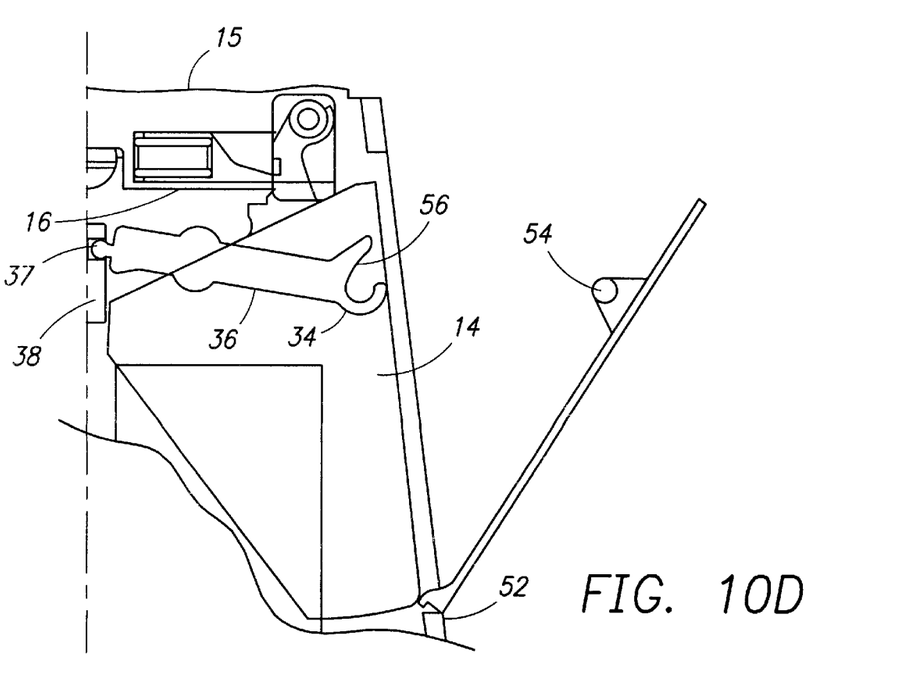

FIG. 10A shows the apparatus with the cover 50 locked in position against pockets in the missile skin. FIG. 10B shows the spool 38 driven upward sufficiently to unlock the latch hook 54 of the cover. In FIG. 10C, the latch arm 36 has rotated farther to the point where the camming surface 56, bearing against the latch member 54, forces the upper end of the cover outward into the airstream. This catches the cover and, as shown in FIG. 10D, results in it being jettisoned away from the missile, thereby permitting the fins 14 to be deployed by the force of springs 15 in the pistons 16a, driving the piston/wedges outward.

Although there have been described herein above various specific arrangements of a FIN AND COVER RELEASE SYSTEM in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. Apparatus for releasing and jettisoning a cover mounted over a slot in the skin of a missile, which slot contains at least one control fin, in order that the fin may be deployed externally of the missile after launch to control the missile flight path, said apparatus comprising:
   a centrally mounted, axially movable spool member mounted for limited movement along the missile longitudinal axis between a first, rest position and a second, elevated position;
   a latch control assembly including a pivotable latch member having an outer end and an inner end;
   the outer end having a hook for releasable coupling to a mating latch element mounted on the inner surface of the cover;
   the inner end being shaped to engage the centrally mounted, axially movable spool member, the movement of the spool member from its rest position to its elevated position serving to pivot the latch member between a latch position in which the outer end of the latch member engages the cover latch element to retain the cover in a closed sealing position against the missile skin and a release position in which the cover is released and driven outwardly to begin external deployment of the fin;
   a pyrotechnic device coupled to propel the spool member out of its rest position upon activation of the pyrotechnic device, the propulsion of the spool member toward its elevated position serving to begin the fin deployment procedure; and
   a housing mounted to support the elements of said apparatus within the missile.

2. The apparatus of claim 1 further including a directional control assembly mounted within said housing to control the angle of said fin after deployment externally of the missile.

3. The apparatus of claim 2 wherein the directional control assembly includes a rotatable shaft connected to said fin by a pivoted support member to vary the angle of said fin, after deployment, and a reversible drive motor coupled to control the degree of rotation of said shaft and associated fin in response to applied electrical signals.

4. The apparatus of claim 3 wherein said drive motor is coupled to said shaft in operative relationship by way of a lever affixed to and extending laterally from said rotatable shaft and a threaded motor shaft, the lever defining a threaded bore engaging the threaded motor shaft to move the lever back and forth along the motor shaft in accordance with the direction of rotation of the motor and thereby rotate said rotatable shaft and fin correspondingly.

5. The apparatus of claim 2 wherein said rotatable shaft extends transversely of the missile axis and is coupled to a pair of fins on opposite sides of the missile such that the angle of both fins is varied in the same direction with rotation of said rotatable shaft.

6. The apparatus of claim 5 wherein there are four fins equally spaced about the circumference of the missile for deployment after launch to control the pitch and yaw of the missile in flight,
   wherein the directional control assembly includes a pair of rotatable shafts, each one being connected between an associated pair of opposed fins to control either pitch or yaw of the missile in flight, each rotatable shaft having an associated drive motor to control rotation thereof in response to applied electrical signals;
   wherein the latch control assembly further includes second, third and fourth pivotable latch members, each being coupled like the first-mentioned pivotable latch member to a corresponding cover mounted over a corresponding slot in the missile skin for each of the second, third and fourth control fins, respectively; and
   wherein the second, third and fourth pivotable latch members are shaped at their inner ends like the first-mentioned pivotable latch member to engage the centrally mounted, axially movable spool member, the propulsion of the spool member out of its rest position upon activation of the pyrotechnic device serving to pivot all four latch members correspondingly to release the four fin slot covers together.

7. The apparatus of claim 6 wherein each latch member is configured at its outer end with a cam surface that bears against the mating latch element after release of the cover latch, thereby forcing the cover outward and away from contact with the missile skin and permitting the associated fin to pivot out of its slot and deploy externally of the missile.

8. The apparatus of claim 7 further including structure defining a hinge point at the aft end of each cover to temporarily retain the aft end of the cover as it pivots outward away from the missile for ultimate jettisoning thereof.

9. The apparatus of claim 3 further including a piston/wedge member mounted to apply outward force against the support lever of the fin as the fin is being rotated outward to the deployed position.

10. The apparatus of claim 9 wherein said piston/wedge member contains a compression spring biasing the piston/wedge member radially outward against the fin support lever.

11. The apparatus of claim 1 further including a wedge block extending between the pyrotechnic device and the spool member for transmitting propulsive force from the pyrotechnic device to the spool member, said wedge block having a slanted upper face for engaging the spool member.

12. The apparatus of claim 11 wherein the spool member is configured to define a wedge block opening below the point of engagement of the spool member by the inner end of the pivotable latch member, said wedge block opening being adapted to receive the wedge block extending radially inward from the pyrotechnic device, said wedge block being constrained for movement orthogonally of the missile axis.

13. The apparatus of claim 12 wherein the spool member wedge block opening has a slanted upper wall angled to match the angle of the upper face of said wedge block and a fracturable lower floor opposite the upper wall, whereby the spool member is restrained against axial movement prior to activation of the pyrotechnic device by the inner end of the wedge block within the wedge opening bearing against said fracturable lower floor, thereby preventing inadvertent release of said cover and resultant deployment of the fin.

14. The apparatus of claim 13 wherein the pyrotechnic device includes an extendable piston mounted to drive the wedge block radially inward for propulsion of the spool member out of its rest position and toward its elevated position to begin the fin deployment procedure.

15. The apparatus of claim 14 wherein extension of said piston on activation of the pyrotechnic device drives the wedge block to fracture said wedge opening floor and permit the spool member to move to its elevated position, thereby causing said pivotable latch members to jettison the fin covers.

16. The apparatus of claim 14 wherein said wedge block is positioned to be driven by the pyrotechnic device upon activation thereof farther into the wedge block opening of the spool member to fracture the fracturable floor and propel the spool member to its elevated position.

* * * * *